(12) United States Patent
Pereira et al.

(10) Patent No.: US 8,457,604 B2
(45) Date of Patent: Jun. 4, 2013

(54) APPARATUS AND METHOD FOR SHARING CONTENT ON A MOBILE DEVICE

(75) Inventors: Mindy Pereira, Sunnyvale, CA (US); Manisha Parekh, Mountain View, CA (US); Michael Rizkalla, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 148 days.

(21) Appl. No.: 12/620,130

(22) Filed: Nov. 17, 2009

(65) Prior Publication Data

US 2011/0117898 A1 May 19, 2011

(51) Int. Cl.
*H04M 11/10* (2006.01)

(52) U.S. Cl.
USPC .......... 455/414.1; 455/412.1; 455/419; 370/352; 370/389; 370/401; 379/88.17; 379/142.06

(58) Field of Classification Search
USPC ......... 455/412.1, 412.2, 413, 414.1–414.4, 455/416, 418–420, 466, 550.1, 556.1, 556.2, 455/566, 567; 709/206, 227, 238, 203, 204, 709/231; 715/751, 752; 705/14.4, 14.49, 705/14.67, 14.72, 14.73; 370/352, 389, 401, 370/522; 348/14.08, 14.09, 14.11; 379/142.06, 379/207.02, 88.17
See application file for complete search history.

(56) References Cited

U.S. PATENT DOCUMENTS

| | | | |
|---|---|---|---|
| 7,013,350 B2* | 3/2006 | Enns et al. | 709/245 |
| 7,277,719 B2* | 10/2007 | Klassen et al. | 455/466 |
| 7,634,502 B2* | 12/2009 | Colton et al. | 1/1 |
| 7,653,744 B2* | 1/2010 | Kanefsky et al. | 709/245 |
| 7,835,392 B2* | 11/2010 | Wang | 370/466 |
| 2003/0217171 A1* | 11/2003 | Von Stuermer et al. | 709/231 |
| 2005/0105524 A1* | 5/2005 | Stevens et al. | 370/389 |
| 2006/0099997 A1* | 5/2006 | Ara | 455/566 |
| 2007/0078720 A1* | 4/2007 | Ravikumar et al. | 705/25 |
| 2007/0150816 A1 | 6/2007 | Hariki | |
| 2008/0208607 A1 | 8/2008 | Ma et al. | |
| 2010/0124939 A1* | 5/2010 | Osborne et al. | 455/466 |
| 2011/0053578 A1* | 3/2011 | Rochford | 455/418 |
| 2011/0106889 A1* | 5/2011 | Scott et al. | 709/206 |

OTHER PUBLICATIONS

IPRP, including Written Opinion of the International Searching Authority, Mailed May 31, 2012; issued in related PCT Application No. PCT/US2010/056966.

* cited by examiner

*Primary Examiner* — Mahendra Patel (57) ABSTRACT

Various embodiments for providing enhanced content sharing on mobile computing devices are described. In one or more embodiments, a mobile computing device may display content and send messages of different types. The mobile computing device may include a content sharing interface to prompt a selection of a recipient for content. The selected recipient may be associated with at least one transport mechanism. The mobile computing device may format the content according to a transport mechanism associated with the selected recipient, open the formatted content in a compose view for the transport mechanism, and to send the formatted content to the selected recipient. Other embodiments are described and claimed.

12 Claims, 6 Drawing Sheets

```
┌─────────────────────────────────────┐
│  RECEIVE INDICATION TO SHARE CONTENT │
│                 502                  │
└─────────────────────────────────────┘
                  │
┌─────────────────────────────────────┐
│  PROMPT FOR AND RECEIVE SELECTION OF A │
│               RECIPIENT              │
│                 504                  │
└─────────────────────────────────────┘
                  │
┌─────────────────────────────────────┐
│     SELECT A TRANSPORT MECHANISM     │
│     ASSOCIATED WITH THE RECIPIENT    │
│                 506                  │
└─────────────────────────────────────┘
                  │
┌─────────────────────────────────────┐
│  FORMAT CONTENT ACCORDING TO TRANSPORT │
│               MECHANISM              │
│                 508                  │
└─────────────────────────────────────┘
                  │
┌─────────────────────────────────────┐
│   OPEN FORMATTED CONTENT IN COMPOSE VIEW │
│                 510                  │
└─────────────────────────────────────┘
                  │
┌─────────────────────────────────────┐
│   SEND FORMATTED CONTENT TO THE RECIPIENT │
│                 512                  │
└─────────────────────────────────────┘
```

APPARATUS AND METHOD FOR SHARING CONTENT ON A MOBILE DEVICE

BACKGROUND

A mobile computing device such as a combination handheld computer and mobile telephone or smart phone generally may provide voice and data communications functionality, as well as computing and processing capabilities. In addition to supporting telephone and voicemail services, a mobile computing device may support various other methods of sending or sharing content, such as facsimile, e-mail, instant messaging (IM), short message service (SMS) messaging, multimedia message service (MMS) messaging, video conferencing, and so forth. Accordingly, there may be a need for an improved apparatus and method for sharing content via a mobile device.

DETAILED DESCRIPTION

Various embodiments are directed to providing enhanced content sharing services. Conventionally, when a user of a mobile device wants to share content, the user may need to select the content from an application, copy the content, open a messaging application, paste the content and then finally send the content. Sometimes, however, the content type and the messaging application are not compatible. In one or more embodiments, a mobile computing device may streamline a process for sharing content with a recipient. In an embodiment, the device may receive, from any application, an indication to share content. The device may then prompt for and receive a selection of a recipient, and a transport mechanism to use to send the content. The device may format the content to be shared according to the transport mechanism and send the formatted content to the recipient.

Figure 1:
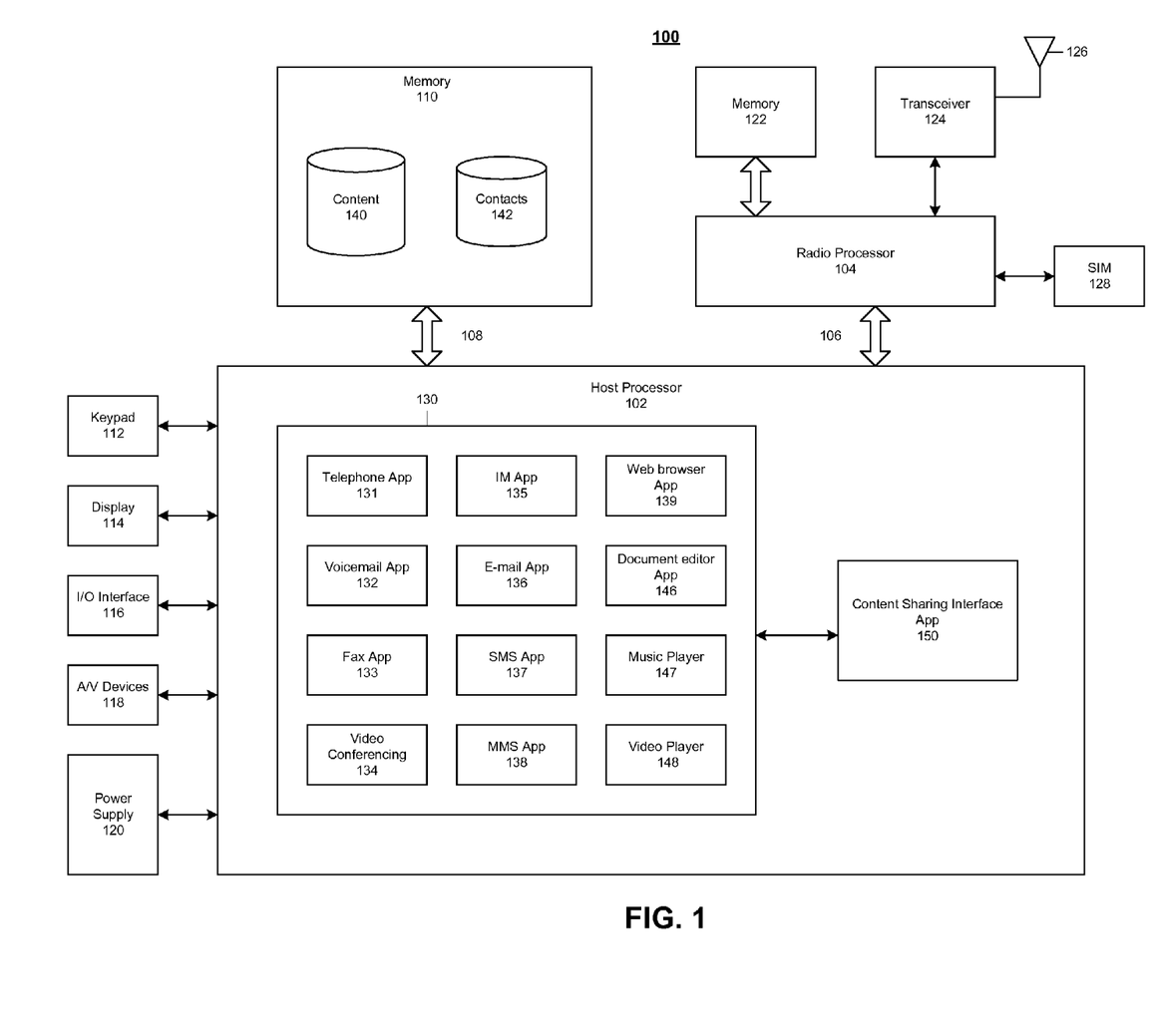
FIG. 1 illustrates a mobile computing device in accordance with one or more embodiments.

FIG. 1 illustrates a mobile computing device 100 in accordance with one or more embodiments. The mobile computing device 100 may be implemented as a combination handheld computer and mobile telephone, sometimes referred to as a smart phone. Examples of smart phones include, but are not limited to, for example, Palm® products such as Palm® Treo™ and Palm® Pre™ smart phones. Although some embodiments may be described with the mobile computing device 100 implemented as a smart phone by way of example, it may be appreciated that the embodiments are not limited in this context. For example, the mobile computing device 100 may comprise, or be implemented as, any type of wireless device, mobile station, or portable computing device with a self-contained power source (e.g., battery) such as a laptop computer, ultra-laptop computer, personal digital assistant (PDA), cellular telephone, combination cellular telephone/PDA, mobile unit, subscriber station, user terminal, portable computer, handheld computer, palmtop computer, wearable computer, media player, pager, messaging device, data communication device, and so forth.

The mobile computing device 100 may provide voice communications functionality in accordance with different types of cellular radiotelephone systems. Examples of cellular radiotelephone systems may include Code Division Multiple Access (CDMA) systems, Global System for Mobile Communications (GSM) systems, North American Digital Cellular (NADC) systems, Time Division Multiple Access (TDMA) systems, Extended-TDMA (E-TDMA) systems, Narrowband Advanced Mobile Phone Service (NAMPS) systems, third generation (3G) systems such as Wide-band CDMA (WCDMA), CDMA-2000, Universal Mobile Telephone System (UMTS) systems, and so forth.

In addition to voice communications functionality, the mobile computing device 100 may be arranged to provide data communications functionality in accordance with different types of cellular radiotelephone systems. Examples of cellular radiotelephone systems offering data communications services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, High Speed Uplink Packet Access (HSUPA), and so forth.

The mobile computing device 100 may be arranged to provide voice and/or data communications functionality in accordance with different types of wireless network systems. Examples of wireless network systems may include a wireless local area network (WLAN) system, wireless metropolitan area network (WMAN) system, wireless wide area network (WWAN) system, and so forth. Examples of suitable wireless network systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth.

The mobile computing device 100 may be arranged to perform data communications in accordance with different types of shorter range wireless systems, such as a wireless personal area network (PAN) system. One example of a suitable wireless PAN system offering data communication services may include a Bluetooth system operating in accordance with the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Other examples may include systems using infrared techniques or near-field communication techniques and protocols, such as electro-magnetic induction (EMI) techniques. An example of EMI techniques may include passive or active radio-frequency identification (RFID) protocols and devices.

As shown in the embodiment of FIG. 1, the mobile computing device 100 may comprise a dual processor architecture including a host processor 102 and a radio processor 104. In various implementations, the host processor 102 and the radio processor 104 may be arranged to communicate with each other using interfaces 106 such as one or more universal serial bus (USB) interfaces, micro-USB interfaces, universal asynchronous receiver-transmitter (UART) interfaces, general purpose input/output (GPIO) interfaces, control/status lines, control/data lines, audio lines, and so forth.

The host processor 102 may be responsible for executing various software programs such as system programs and applications programs to provide computing and processing operations for the mobile computing device 100. The radio processor 104 may be responsible for performing various voice and data communications operations for the mobile computing device 100 such as transmitting and receiving voice and data information over one or more wireless communications channels. Although some embodiments may be described as comprising a dual processor architecture for purposes of illustration, it is worthy to note that the mobile computing device 100 may comprise any suitable processor architecture and/or any suitable number of processors consistent with the described embodiments.

The host processor 102 may be implemented as a host central processing unit (CPU) using any suitable processor or logic device, such as a general purpose processor. Although some embodiments may be described with the host processor 102 implemented as a CPU or general purpose processor by way of example, it may be appreciated that the embodiments are not limited in this context. For example, the host processor 102 may comprise, or be implemented as, a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the host processor 102 may be coupled through a memory bus 108 to a memory 110. The memory bus 108 may comprise any suitable interface and/or bus architecture for allowing the host processor 102 to access the memory 110. Although the memory 110 may be shown as being separate from the host processor 102 for purposes of illustration, it is worthy to note that in various embodiments some portion or the entire memory 110 may be included on the same integrated circuit as the host processor 102. Alternatively, some portion or the entire memory 110 may be disposed on an integrated circuit or other medium (e.g., hard disk drive) external to the integrated circuit of host processor 102. In various embodiments, the mobile computing device 100 may comprise an expansion slot to support a multimedia and/or memory card, for example.

The memory 110 may be implemented using any machine-readable or computer-readable media capable of storing data such as volatile memory or non-volatile memory, removable or non-removable memory, erasable or non-erasable memory, writeable or re-writeable memory, and so forth. Examples of machine-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The mobile computing device 100 may comprise an alphanumeric keypad 112 coupled to the host processor 102. The keypad 112 may comprise, for example, a QWERTY key layout and an integrated number dial pad. The mobile computing device 100 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth.

The mobile computing device 100 may comprise a display 114 coupled to the host processor 102. The display 114 may comprise any suitable visual interface for displaying content to a user of the mobile computing device 100. In one embodiment, for example, the display 114 may be implemented by a liquid crystal display (LCD) such as a touch-sensitive color (e.g., 16-bit color) thin-film transistor (TFT) LCD screen. In some embodiments, the touch-sensitive LCD may be used with a stylus and/or a handwriting recognizer program.

The mobile computing device 100 may comprise an input/output (I/O) interface 116 coupled to the host processor 102. The I/O interface 116 may comprise one or more I/O devices such as a serial connection port, an infrared port, integrated Bluetooth® wireless capability, and/or integrated 802.11x (WiFi) wireless capability, to enable wired (e.g., USB cable) and/or wireless connection to a local computer system, such as a local personal computer (PC). In various implementations, mobile computing device 100 may be arranged to transfer and/or synchronize information with the local computer system.

The host processor 102 may be coupled to various audio/video (A/V) devices 118 that support A/V capability of the mobile computing device 100. Examples of A/V devices 118 may include, for example, a microphone, one or more speakers, an audio port to connect an audio headset, an audio coder/decoder (codec), an audio player, a digital camera, a video camera, a video codec, a video player, and so forth.

The host processor 102 may be coupled to a power supply 120 arranged to supply and manage power to the elements of the mobile computing device 100. In various embodiments, the power supply 120 may be implemented by a rechargeable battery, such as a removable and rechargeable lithium ion battery to provide direct current (DC) power, and/or an alternating current (AC) adapter to draw power from a standard AC main power supply.

As mentioned above, the radio processor 104 may perform voice and/or data communication operations for the mobile computing device 100. For example, the radio processor 104 may be arranged to communicate voice information and/or data information over one or more assigned frequency bands of a wireless communication channel. In various embodiments, the radio processor 104 may be implemented as a communications processor using any suitable processor or logic device, such as a modem processor or baseband processor. Although some embodiments may be described with the radio processor 104 implemented as a modem processor or baseband processor by way of example, it may be appreciated that the embodiments are not limited in this context. For example, the radio processor 104 may comprise, or be implemented as, a digital signal processor (DSP), media access control (MAC) processor, or any other type of communications processor in accordance with the described embodiments.

In various embodiments, the radio processor 104 may perform analog and/or digital baseband operations for the mobile computing device 100. For example, the radio processor 104 may perform digital-to-analog conversion (DAC), analog-to-digital conversion (ADC), modulation, demodulation, encoding, decoding, encryption, decryption, and so forth.

The mobile computing device 100 may comprise a memory 122 coupled to the radio processor 104. The memory 122 may be implemented using one or more types of machine-readable or computer-readable media capable of storing data such as volatile memory or non-volatile memory, removable or non-removable memory, erasable or non-erasable memory, writeable or re-writeable memory, and so forth. The memory 122 may comprise, for example, flash memory and secure digital (SD) RAM. Although the memory 122 may be shown as being separate from and external to the radio processor 104 for purposes of illustration, it is worthy to note that in various embodiments some portion or the entire memory 122 may be included on the same integrated circuit as the radio processor 104.

The mobile computing device 100 may comprise a transceiver module 124 coupled to the radio processor 104. The transceiver module 124 may comprise one or more transceivers arranged to communicate using different types of protocols, communication ranges, operating power requirements, RF sub-bands, information types (e.g., voice or data), use scenarios, applications, and so forth. In various embodiments, the transceiver module 124 may comprise one or more transceivers arranged to support voice communication for a cellular radiotelephone system such as a GSM, UMTS, and/or CDMA system. The transceiver module 124 also may comprise one or more transceivers arranged to perform data communications in accordance with one or more wireless communications protocols such as WWAN protocols (e.g., GSM/GPRS protocols, CDMA/1xRTT protocols, EDGE protocols, EV-DO protocols, EV-DV protocols, HSDPA protocols, etc.), WLAN protocols (e.g., IEEE 802.11a/b/g/n, IEEE 802.16, IEEE 802.20, etc.), PAN protocols, Infrared protocols, Bluetooth protocols, EMI protocols including passive or active RFID protocols, and so forth. In some embodiments, the transceiver module 124 may comprise a Global Positioning System (GPS) transceiver to support position determination and/or location-based services.

The transceiver module 124 generally may be implemented using one or more chips as desired for a given implementation. Although the transceiver module 124 may be shown as being separate from and external to the radio processor 104 for purposes of illustration, it is worthy to note that in various embodiments some portion or the entire transceiver module 124 may be included on the same integrated circuit as the radio processor 104. The embodiments are not limited in this context.

The mobile computing device 100 may comprise an antenna system 126 for transmitting and/or receiving electrical signals. As shown, the antenna system 126 may be coupled to the radio processor 104 through the transceiver module 124. The antenna system 126 may comprise or be implemented as one or more internal antennas and/or external antennas.

The mobile computing device 100 may comprise a subscriber identity module (SIM) 128 coupled to the radio processor 104. The SIM 128 may comprise, for example, a removable or non-removable smart card arranged to encrypt voice and data transmissions and to store user-specific data for allowing a voice or data communications network to identify and authenticate the user. The SIM 128 also may store data such as personal settings specific to the user.

As mentioned above, the host processor 102 may be arranged to provide processing or computing resources to the mobile computing device 100. For example, the host processor 102 may be responsible for executing various software programs such as system programs and application programs to provide computing and processing operations for the mobile computing device 100.

System programs generally may assist in the running of the mobile computing device 100 and may be directly responsible for controlling, integrating, and managing the individual hardware components of the computer system. Examples of system programs may include, without limitation, an operating system (OS), device drivers, programming tools, utility programs, software libraries, application programming interfaces (APIs), and so forth. The mobile computing device 100 may utilize any suitable OS in accordance with the described embodiments such as a Palm OS®, Palm OS® Cobalt, Palm® webOS™, Microsoft® Windows OS, Microsoft Windows® CE, Microsoft Pocket PC, Microsoft Mobile, Symbian OS™, Embedix OS, Linux, Binary Run-time Environment for Wireless (BREW) OS, JavaOS, a Wireless Application Protocol (WAP) OS, and so forth.

Application programs generally may allow a user to accomplish one or more specific tasks. Examples of application programs may include, without limitation, one or more messaging applications (e.g., telephone, voicemail, facsimile, e-mail, IM, SMS, MMS, video conferencing), a web browser application, personal information management (PIM) applications (e.g., contacts, calendar, scheduling, tasks), word processing applications, spreadsheet applications, database applications, media applications (e.g., video player, audio player, multimedia player, digital camera, video camera, media management), gaming applications, and so forth. In various implementations, the application programs may provide one or more graphical user interfaces (GUIs) to communicate information between the mobile computing device 100 and a user. In some embodiments, application programs may comprise upper layer programs running on top of the OS of the host processor 102 that operate in conjunction with the functions and protocols of lower layers including, for example, a transport layer such as a Transmission Control Protocol (TCP) layer, a network layer such as an Internet Protocol (IP) layer, and a link layer such as a Point-to-Point (PPP) layer used to translate and format data for communication.

As shown in FIG. 1, the mobile computing device 100 may comprise or implement several applications 130 arranged to communicate various types of messages in a variety of formats, to view and manipulate content, etc. The applications 130 may comprise messaging applications, for example, a telephone application 131 such as a cellular telephone application, a Voice over Internet Protocol (VoIP) application, a Push-to-Talk (PTT) application, and so forth. The applications 130 may further comprise a voicemail application 132, a facsimile application 133, a video teleconferencing application 134, an IM application 135, an e-mail application 136, an SMS application 137, and an MMS application 138. The applications may further comprise applications to view and edit or otherwise manipulate content, such as a web browser 139, a document editor 146, a music player 147, and a video player 148. It is to be understood that the embodiments are not limited in this regard and that the applications 130 may include any other type of application that is consistent with the described embodiments.

The mobile computing device 100 may comprise a content storage 140. The content storage 140 may be arranged to store content, such as documents, media files, messages, etc. The content storage 140 may be implemented in the memory 110 of the mobile computing device, for example.

The mobile computing device 100 also may comprise a contacts database 142. The contacts database 142 may be arranged to store contact records for individuals or entities specified by the user of the mobile computing device 100. The contact record for an individual may comprise identifying information such as first name, last name, company/employer name, mailing addresses (e.g., home, work, other), telephone numbers (e.g., home, work, mobile, fax, pager), e-mail address (e.g., home, work, primary, alternative), IM screen names, SMS identifier, MMS identifier, personal information, notes, and so forth.

The contacts database 142 may be used or accessed when receiving and/or sending messages, or sharing content. The contacts database 142 also may be used or accessed when composing and/or sending messages that contain shared content. For example, the user of the mobile computing device 100 may search for and open the contact record of a particular individual to initiate communication. In addition, contact records in the contacts database 142 may be filtered and matched against text typed by a user in a content sharing interface application 150 to facilitate content sharing.

As shown in FIG. 1, the mobile computing device 100 may comprise or implement a content sharing interface 150 coupled to the applications 130. In various embodiments, the content sharing interface 150 may be arranged to access and communicate with one or more of the content storage 140, the contacts database 142, and applications 130.

In various embodiments, the content sharing interface 150 may be arranged to provide an interface method for returning a formatted version of content that the user wants to share. When an application 130 receives an indication from the user that the user wants to share content, e.g. an image, a web page, a document, etc., the application 130 may call the content sharing interface 150 with the content type. Content sharing interface 150 may prompt the user to select a recipient for the content from contacts 142. Content sharing interface 150 may provide its own contact selector interface or may use other contact selection applications or interfaces. If the selected recipient (or recipients) has more than one possible transport mechanism for contact, then content sharing interface 150 may prompt the user to select the particular transport mechanism to use. A transport mechanism may include, for example, a SMS message, a MMS message, a telephone message, a voicemail message, a fax message, a video conferencing message, an IM message, an e-mail message, etc. In an embodiment, application 130 may convert the content and provide the converted content to content sharing interface 150. Content sharing interface 150 may, alternatively, convert the content to be shared to a format that is compatible with transmission via the selected transport mechanism, and populate a compose view for that transport mechanism that contains the selected contact information and the converted content.

Figure 2:
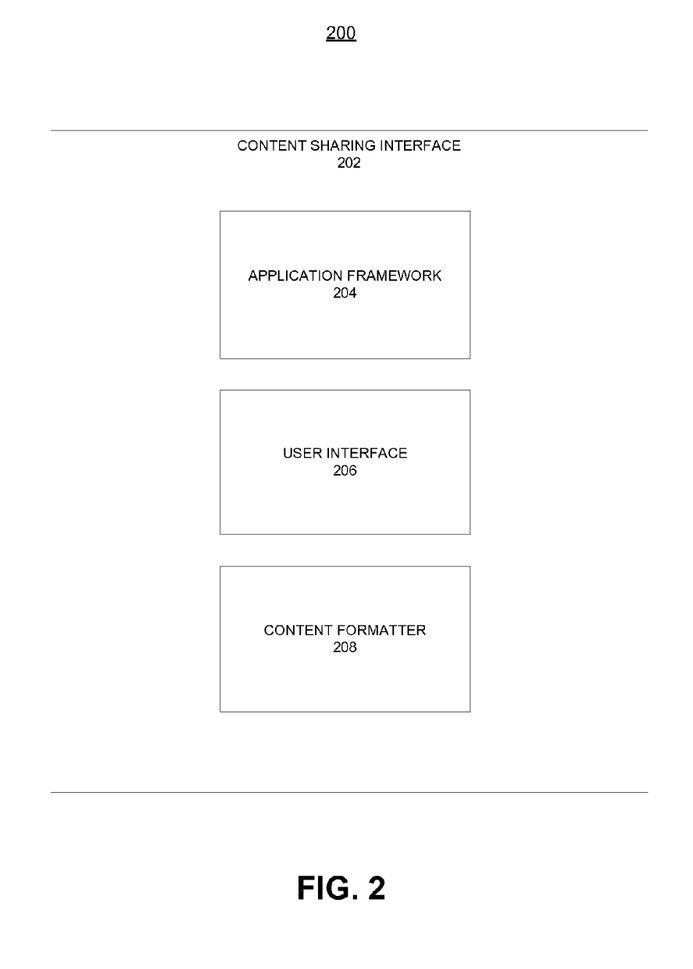
FIG. 2 illustrates components of a content sharing interface in accordance with one or more embodiments.

FIG. 2 illustrates a block diagram 200 representing a content sharing interface application 202. Content sharing interface 202 may be an embodiment of content sharing interface 150. Content sharing interface 202 may include one or more modules to perform the functions described herein. For example, in an embodiment, content sharing interface 202 may include an application framework 204, a user interface 206, and a content formatter 208. The embodiments are not limited to this example.

Application framework 204 may provide, for example, an interface of function calls, routines, library files or other mechanisms that an application 130 may use to invoke the functionality of content sharing interface 202. Application framework 204 may receive, for example, a content type and/or converted content from an application 130.

User interface 206 may provide a graphical interface displayable on mobile computing device 100 that allows the user of the device to interact with content sharing interface 202. User interface 206 may provide, for example, a contact selection interface to display available contacts and receive a selection of one or more contacts to receive content. User interface 206 may provide, for example, a compose view to display the message containing the selected converted content prior to sending. User interface 206 may provide the compose view without having to open a specific messaging application.

Content formatter 208 may convert content that is selected for sharing into a format compatible with the transport mechanism selected by the user. For example, hypertext markup language (HTML) text or rich-formatted text may be converted to unformatted text for transmission via a text message. Audio content may be "transcribed" and converted to text via a speech-recognition process. Text may be converted to speech for a voicemail message. Plain text may be converted to rich text. A web page may be converted to a uniform resource locator (URL) pointing to that web page. A map, e.g. a series of tiles, may be converted to an image. In some embodiments, or for some applications 130, the application 130 may perform the conversion of content and supply the converted content to content sharing interface 200 for insertion into a compose view.

Figure 3:
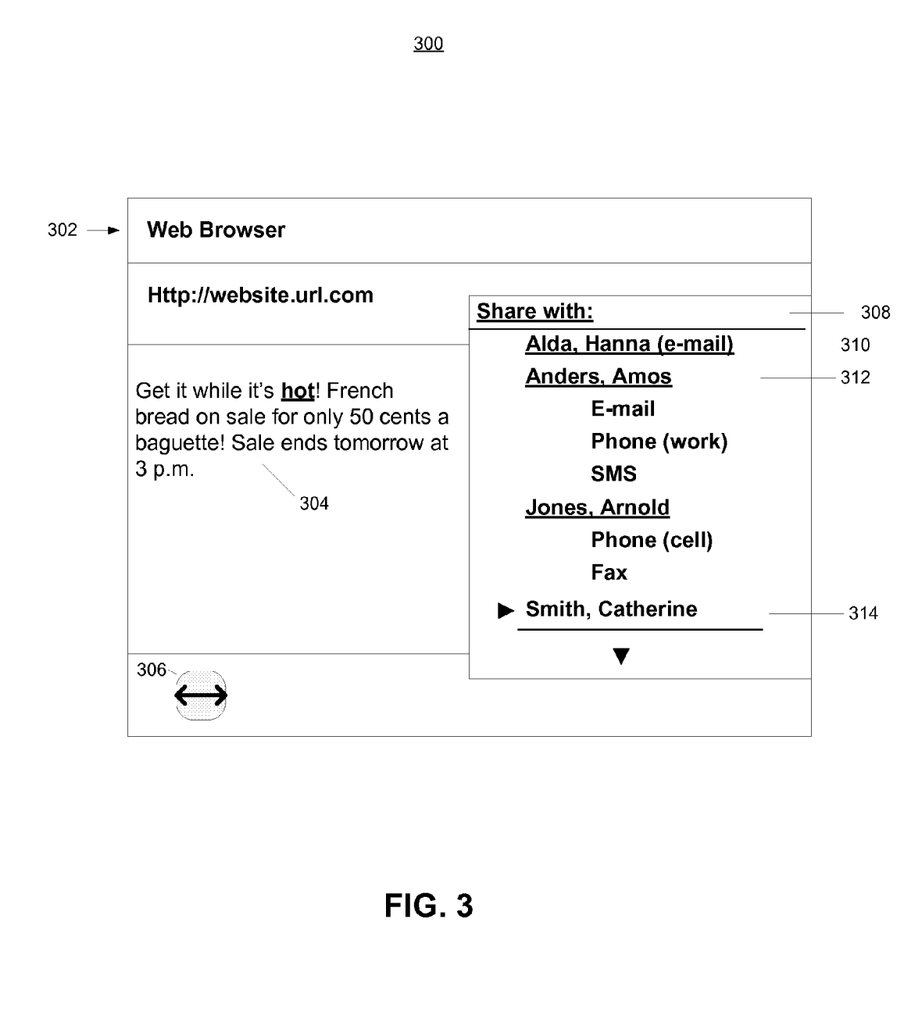
FIG. 3 illustrates a content sharing user interface in accordance with one or more embodiments.

FIG. 3 illustrates a content sharing UI 300 in accordance with one or more embodiments which may be displayed to a user of the mobile computing device 100 of FIG. 1. Content sharing UI 300 may appear in conjunction with a content viewing application, such as a web browser 302. The content viewing application may display content, for example, HTML text 304. The embodiments are not limited to these examples.

In various implementations, the content sharing UI 300 may be presented to a user, for example, by selecting a hard or soft button, such as soft button 306, by a key combination, a stylus selection, etc. The content sharing UI 300 may open a menu, such as menu 308. Menu 308 may display a list of the contacts from contacts database 142. A contact associated with only one transport mechanism may be displayed as a single line, for example, contact entry 310. Other contacts may be displayed with a sub-listing of all of the transport mechanisms associated with it, for example, contact entry 312. In an embodiment, a contact with multiple transport mechanisms associated therewith may be displayed in a collapsed form, with an indicator that the contact entry may be expanded, such as contact entry 314. Alternatively, in an embodiment, content sharing UI 300 may ask the user to select a transport mechanism first, and then present a contact selection interface. It can be appreciated, however, that the embodiments are not limited in this context and that content sharing UI 300 may present contacts for selection in a variety of ways.

Figure 4:
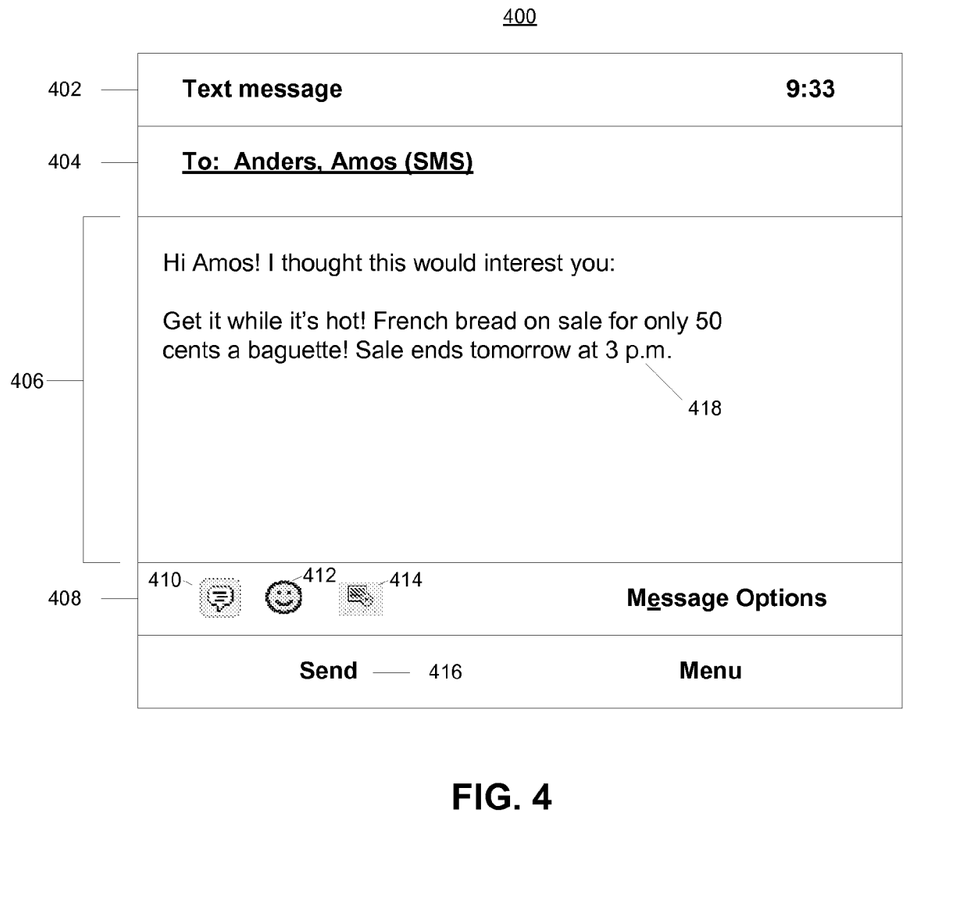
FIG. 4 illustrates a compose view in accordance with one or more embodiments.

FIG. 4 illustrates a compose view 400 in accordance with one or more embodiments which may be displayed to a user of the mobile computing device 100 of FIG. 1. In various embodiments, the compose view 400 may be supported by an application such as an SMS application, an e-mail application, etc. For example, the compose view 400 may comprise an SMS compose view messaging UI. The embodiments, however, are not limited in this context.

The compose view 400 may be presented by content sharing interface 150 once the user has selected a recipient and a transport mechanism for the content to be shared. As shown, the compose view 400 may comprise a title bar 402 for displaying the title of a particular messaging application and the current time. The compose view 400 also may comprise an address bar 404. As shown, the address bar 404 may comprise a 'To' field which may display the contact name (e.g., Amos Anders) of the selected recipient. In some cases, the address bar 404 may comprise other items such as a 'CC' field, a 'BCC' field, a subject field, contact picture, status line (e.g., message priority, receipt status, errors, receipt request, validity period), callback number, vCard, vCal, and so forth.

The compose view 400 may comprise a message composition area 406 for entering message text. In an embodiment, the compose view 400 may open with the converted content 418 to be shared (e.g. converted from content 304 from FIG. 3) already in the message composition area 406. The user may then edit or add additional message content.

The compose view 400 may comprise a status bar 408. As shown, the status bar 408 may comprise a text button 410 for displaying a pop-up list of boilerplate text strings that can be inserted into messages and edited. The status bar 408 may comprise an emoticon button 412 to display a pop-up of list emoticons that can be inserted into the text area. Status bar 408 may comprise other buttons for additional message-related functions.

In various embodiments, the compose view 400 may allow the user to add media objects such as pictures, video, and/or sounds to a message. In some embodiments, for example, the message composition area 406 may comprise one or more add media button and/or an add media soft key. For example, the status bar 408 may comprise an add media button 414. The embodiments are not limited in this context.

As shown in FIG. 4, the compose view 400 may include a soft "send" button 416 to allow the user to send the compose message to the selected recipient. Mobile computing device 100 may alternatively, or in addition, provide a hard "send" button on a keypad. Compose view 400 may vary according to the particular transport mechanism and may have more or fewer components than those shown. The embodiments are not limited to these examples.

Figure 5:
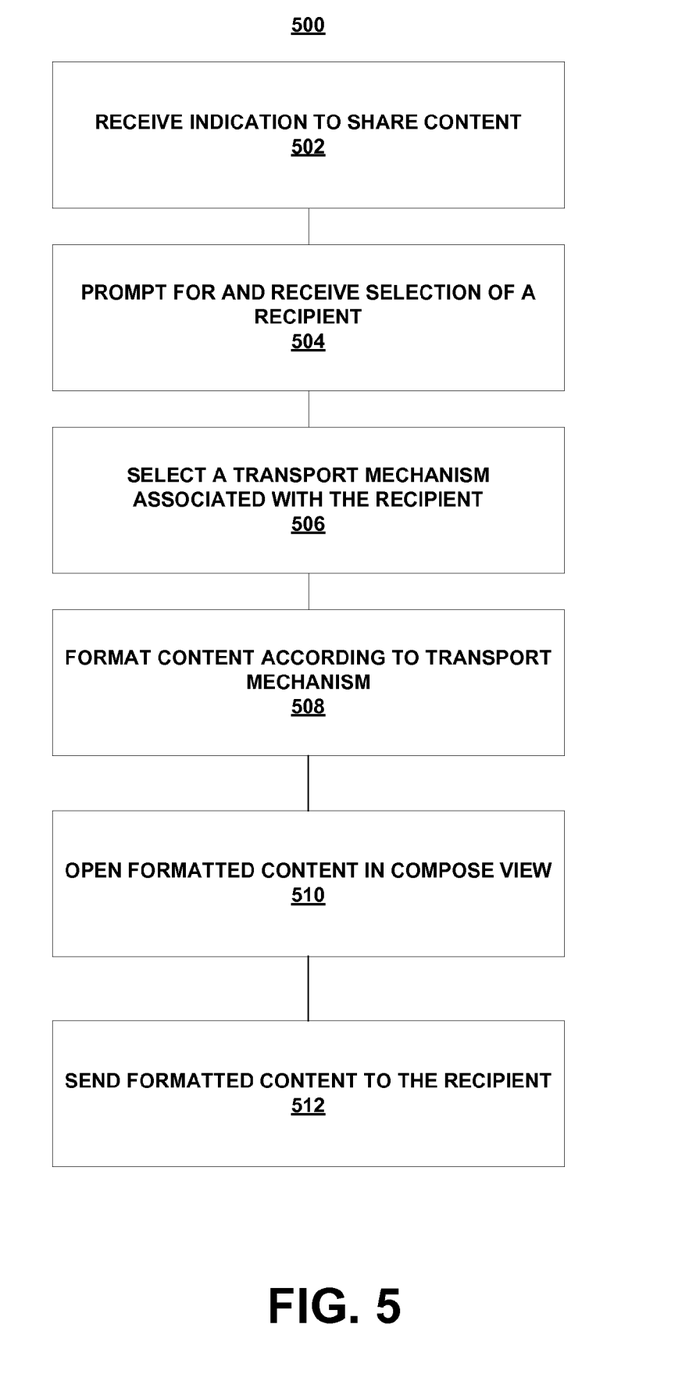
FIG. 5 illustrates a logic flow in accordance with one or more embodiments.

FIG. 5 illustrates a logic flow 500 in accordance with one or more embodiments. The logic flow 500 may be performed by various systems and/or devices and may be implemented as hardware, software, and/or any combination thereof, as desired for a given set of design parameters or performance constraints. For example, the logic flow 500 may be implemented by a logic device (e.g., processor) and/or logic comprising instructions, data, and/or code to be executed by a logic device. For purposes of illustration, and not limitation, the logic flow 500 is described with reference to FIG. 1. The embodiments are not limited in this context.

In various embodiments, the logic flow 500 may comprise receiving an indication to share content (block 502). In an embodiment, a user may indicate that he wishes to share content that is concurrently displayed on the display. In an embodiment, the user may select stored content to share for example, from content 140, without the content being displayed. The indication may be received, for example, from a menu option, a device hard button, a device soft button, a key press, a key combination, etc.

The logic flow 500 may comprise prompting a user to select a recipient for the content, and receiving a selection of a recipient (block 504). The prompt may come, for example, from content sharing UI 300. In an embodiment, a contact picker may be opened that displays the contacts, for example, from contacts database 142.

The logic flow 500 may optionally further allow the user to select a particular transport mechanism for the selected recipient (block 506), if the selected recipient has more than one option. For example, the selected recipient may have one or more telephone numbers, e-mail addresses, IM screen names, fax numbers, etc. If the selected recipient has only one transport mechanism associated with it, then further selection is not required, and the one transport mechanism may be automatically selected.

The logic flow 500 may comprise formatting the content for the selected transport mechanism (block 508). Formatting may be performed, for example, by content formatter 208, or by the application that is generating or displaying the content. In some embodiments, formatting may include converting content to text. For example, hypertext markup language (HTML) text or rich-formatted text may be converted to unformatted text for transmission via a text message. Audio content may be "transcribed" and converted to text via a speech-recognition process. Text may be converted to speech for a voicemail message. Plain text may be converted to rich text. A web page may be converted to a uniform resource locator (URL) pointing to that web page. A map, e.g. a series of tiles, may be converted to an image.

In some embodiments, the contact information for a recipient may include information about the type of device that the recipient uses to receive messages of a particular transport mechanism. If a recipient has a type of smart phone, for example, formatting the content may include formatting the content in a way to take advantage of features available on that particular type of device. The embodiments are not limited to these examples.

The logic flow 500 may comprise opening the formatted content in a compose view populated with the formatted content and the selected recipient's contact information for the selected transport mechanism (block 510). The compose view may be, for example, compose view 400. The user may edit the message, and/or may send the message in block 512. Logic flow 500 may provide the compose view without having to open a specific messaging application.

In an embodiment, content may be shared in the background without opening a compose view, once the user has selected the recipient and transport mechanism. In an embodiment, for example, the user may be prompted to choose between viewing the message and sending without viewing (not shown).

Figure 6:
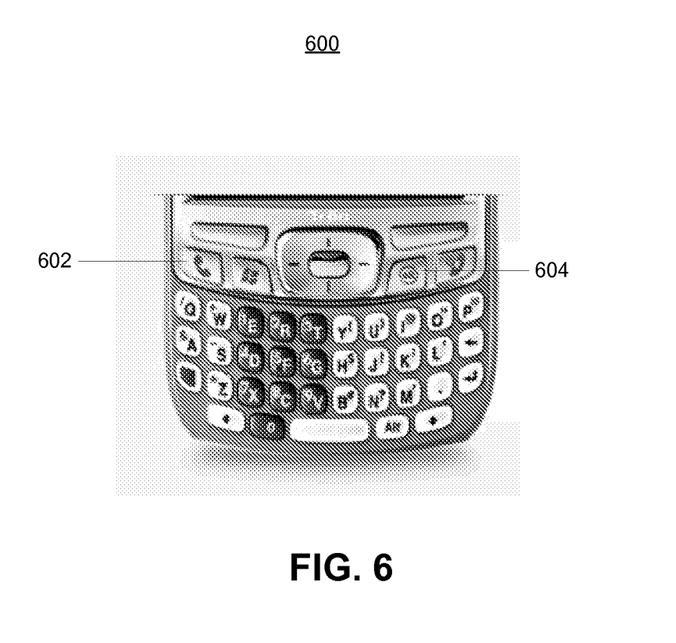
FIG. 6 illustrates a keypad for a mobile computing device in accordance with one or more embodiments.

FIG. 6 illustrates a keypad 600 in accordance with one or more embodiments which may be implemented by the mobile computing device 100. As shown, the keypad 600 may comprise various hardware buttons including, but not limited to, a talk button 602 and an 'ok' button 604. In various embodiments, while selecting a contact, or while in compose mode, the user select a menu option or a soft button, for example, by pressing the 'ok' hardware button 604 on the keypad 600. The embodiments are not limited in this context.

Numerous specific details have been set forth to provide a thorough understanding of the embodiments. It will be understood, however, that the embodiments may be practiced without these specific details. In other instances, well-known operations, components and circuits have not been described in detail so as not to obscure the embodiments. It can be appreciated that the specific structural and functional details are representative and do not necessarily limit the scope of the embodiments.

Various embodiments may comprise one or more elements. An element may comprise any structure arranged to perform certain operations. Each element may be implemented as hardware, software, or any combination thereof, as desired for a given set of design and/or performance constraints. Although an embodiment may be described with a limited number of elements in a certain topology by way of example, the embodiment may include more or less elements in alternate topologies as desired for a given implementation.

It is worthy to note that any reference to "one embodiment" or "an embodiment" means that a particular feature, structure, or characteristic described in connection with the embodiment is included in at least one embodiment. The appearances of the phrase "in one embodiment" in the specification are not necessarily all referring to the same embodiment.

Although some embodiments may be illustrated and described as comprising exemplary functional components or modules performing various operations, it can be appreciated that such components or modules may be implemented by one or more hardware components, software components, and/or combination thereof. The functional components and/or modules may be implemented, for example, by logic (e.g., instructions, data, and/or code) to be executed by a logic device (e.g., processor). Such logic may be stored internally or externally to a logic device on one or more types of computer-readable storage media.

It also is to be appreciated that the described embodiments illustrate exemplary implementations, and that the functional components and/or modules may be implemented in various other ways which are consistent with the described embodiments. Furthermore, the operations performed by such components or modules may be combined and/or separated for a given implementation and may be performed by a greater number or fewer number of components or modules.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. With respect to software elements, for example, the term "coupled" may refer to interfaces, message interfaces, API, exchanging messages, and so forth.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a processor, or any combination thereof.

While certain features of the embodiments have been illustrated as described above, many modifications, substitutions, changes and equivalents will now occur to those skilled in the art. It is therefore to be understood that the appended claims are intended to cover all such modifications and changes as fall within the true spirit of the embodiments.

The invention claimed is:

1. A mobile computing device including an application, a content sharing interface, and a user interface, the mobile computing device comprising:
an application framework operative to invoke the content sharing interface, the content sharing interface including the user interface operative to:
prompt for and receive a selection of a recipient for a message;
prompt for and receive a selection of a compatible transport mechanism for a message from a generated list of at least one compatible transport mechanism associated with the selected recipient;
format the content of the message according to the selected transport mechanism, the formatting including changing the content when necessary from a first format to a second format compatible with the transport mechanism;
display the formatted content in a compose view of the mobile computing device, the compose view including a message composition area operative to edit the formatted content, receive additional message content, and insert a text message string, emoticon, or media object;
verify a type of device for the selected recipient;
format the content according to the device for the selected recipient; and
send the message to the selected recipient.

2. The mobile computing device of claim 1, the transport mechanism comprising at least one of: a text message, an e-mail message, an instant message, a short message service (SMS) message, a multimedia message service (MMS) message, a facsimile, or a voicemail message.

3. The mobile computing device of claim 1, the content sharing interface to receive formatted content from an application accessing the application framework.

4. A computer-implemented method, comprising:
receiving, on a mobile computing device, an indication to share content;
prompting for and receiving a selection of a recipient;
prompting for and receiving a selection of a transport mechanism for a message from a list of at least one transport mechanism generated in response to the selection of the recipient and associated with the selected recipient;
formatting the content to be shared for the message according to the selection of the transport mechanism associated with the selection, the formatting including changing the content from a first format to a second format compatible for sending via the transport mechanism associated with the selected recipient;
displaying the formatted content in a compose view on the device, the compose view including a message composition area for editing the formatted content; receiving additional message content; and inserting a text message string, emoticon, or media object into the message;
verifying a type of device for the recipient;
formatting the content according to the device; and
sending the formatted content message to the recipient.

5. The method of claim 4, further comprising:
receiving the indication to share content while displaying the content.

6. The method of claim 5, receiving the indication further comprising:
receiving a selection of at least one of: a menu option, a device hard button, a device soft button, a key press, or a key combination.

7. The method of claim 4, the transport mechanism comprising at least one of: a text message, an e-mail message, an instant message, a short message service (SMS) message, a multimedia message service (MMS) message, a facsimile, or a voicemail message.

8. The method of claim 4, the formatting the content further comprising:
converting content from a first type to a second type, wherein a type comprises one of: rich text, plain text, audio data, video data, image data, a uniform resource locator (URL), a map, or HTML.

9. A non-transitory machine-readable storage medium comprising instructions that when executed by a computing system enable the computing system to:
receive, on a mobile computing device, an indication to share content;
prompt for and receive a selection of a recipient;
prompt for and receive a selection of a transport mechanism for a message from a list of at least one transport mechanism generated in response to the selection of the recipient and associated with the selected recipient;
format the content to be shared for the message according to the selection of the transport mechanism associated with the selection, the formatting including changing the content from a first format to a second format compatible for sending via the transport mechanism associated with the selected recipient;
display the formatted content in a compose view on the device, the compose view including a message composition area operative to edit the formatted content;
receive additional message content; and insert a text message string, emoticon, or media object into the message
verify a type of device for the selected recipient; and
format the content according to the device for the selected recipient.

10. The non-transitory machine-readable storage medium of claim 9, the instructions further enabling the computer system to:
send the formatted content to the recipient.

11. The non-transitory machine-readable storage medium of claim 9, the transport mechanism comprising at least one of: a text message, an e-mail message, an instant message, a short message service (SMS) message, a multimedia message service (MMS) message, a facsimile, or a voicemail message.

12. The non-transitory machine-readable storage medium of claim 9, the instructions to format content comprising instructions enabling the computer system to perform at least one of:
convert rich text to plain text;
convert audio data to text;
convert text to audio data;
convert plain text to rich text;
convert a web page to a uniform resource locator (URL) pointing to that web page; and
convert a map comprising a series of tiles to an image.

* * * * *